(12) United States Patent
Papin et al.

(10) Patent No.: US 10,907,489 B2
(45) Date of Patent: Feb. 2, 2021

(54) VANED RING FOR TURBOMACHINE STATOR HAVING VANES CONNECTED TO AN OUTER SHELL BY CONICAL SEATING AND FRANGIBLE PIN

(71) Applicant: SAFRAN AIRCRAFT ENGINES, Paris (FR)

(72) Inventors: Thierry Georges Paul Papin, Moissy-Cramayel (FR); Kaelig Merwen Orieux, Moissy-Cramayel (FR); Jean-Marc Claude Perrollaz, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 69 days.

(21) Appl. No.: 16/271,991

(22) Filed: Feb. 11, 2019

(65) Prior Publication Data
US 2020/0024997 A1    Jan. 23, 2020

(30) Foreign Application Priority Data

Feb. 16, 2018    (FR) ...................... 18 51347

(51) Int. Cl.
*F01D 9/04*    (2006.01)

(52) U.S. Cl.
CPC ............. *F01D 9/042* (2013.01); *F01D 9/041* (2013.01); *F05D 2240/12* (2013.01);
(Continued)

(58) Field of Classification Search
CPC .......... F01D 9/041; F01D 9/042; F01D 25/28; F01D 25/246; F05D 2260/311
See application file for complete search history.

(56) References Cited

U.S. PATENT DOCUMENTS

| | | | | |
|---|---|---|---|---|
| 2,834,537 A | * | 5/1958 | Neary | ..................... F01D 9/042 415/209.2 |
| 4,498,291 A | * | 2/1985 | Jeffery | .................. F01D 21/045 415/9 |

(Continued)

FOREIGN PATENT DOCUMENTS

| | | | |
|---|---|---|---|
| DE | 202016103137 U1 * | 8/2016 | ............... F01D 5/30 |
| EP | 0 171 329 A1 | 2/1986 | |

(Continued)

OTHER PUBLICATIONS

French Preliminary Search Report dated Oct. 4, 2018 in French Application 18 51347, filed on Feb. 16, 2018 (with English Translation of Categories of Cited Documents).

(Continued)

*Primary Examiner* — Justin D Seabe
(74) *Attorney, Agent, or Firm* — Oblon, McClelland, Maier & Neustadt, L.L.P.

(57) ABSTRACT

A vaned ring for a turbomachine stator includes an outer shell, a vane having a vane head, and two platforms arranged circumferentially on either side of the vane head, and fixed on a radially inner face of the outer shell by detachable fasteners. The vane head has first conical seatings bearing on respective second conical seatings of the two platforms so as to prevent a displacement of the vane radially inwards and along the circumferential direction. The vaned ring includes a frangible pin including a base mounted on the outer shell and a head projecting radially inwards with respect to the outer shell and having a head surface forming, vis-à-vis a top surface of the vane head, a stop opposing a displacement of the vane radially outwards.

14 Claims, 4 Drawing Sheets

(52) U.S. Cl.
CPC .... *F05D 2240/80* (2013.01); *F05D 2250/232* (2013.01); *F05D 2260/311* (2013.01)

(56) References Cited

U.S. PATENT DOCUMENTS

| | | | | |
|---|---|---|---|---|
| 5,074,752 | A * | 12/1991 | Murphy | F01D 9/042 415/119 |
| 7,614,848 | B2 * | 11/2009 | Bogue | B23P 6/005 29/888.022 |
| 8,303,246 | B2 * | 11/2012 | Drelon | F01D 9/042 415/142 |
| 8,684,697 | B2 * | 4/2014 | Werther | F01D 9/042 416/220 R |
| 8,740,556 | B2 | 6/2014 | Papin et al. | |
| 9,528,441 | B2 | 12/2016 | Cretin et al. | |
| 9,556,745 | B2 | 1/2017 | Papin et al. | |
| 9,771,968 | B2 | 9/2017 | Duchatelle et al. | |

FOREIGN PATENT DOCUMENTS

| | | |
|---|---|---|
| EP | 2 447 474 A1 | 5/2012 |
| EP | 2 988 005 A1 | 2/2016 |
| FR | 3 038 344 | 1/2017 |
| JP | 60-209604 | 10/1985 |

OTHER PUBLICATIONS

U.S. Appl. No. 15/403,727, filed Jan. 11, 2017, 2017/0204879 A1, Cedric Zaccardi, et al.
U.S. Appl. No. 15/472,787, filed Mar. 29, 2017, 2017/0284417 A1, Cedric Zaccardi, et al.
U.S. Appl. No. 15/653,976, filed Jul. 19, 2017, 2018/0023406 A1, Cedric Zaccardi, et al.
U.S. Appl. No. 15/914,150, filed Mar. 7, 2018, 2018/0258779 A1, Mohamed-Lamine Boutaleb, et al.
U.S. Appl. No. 15/225,990, filed Aug. 2, 2016, 2017/0037871 A1, Thierry Georges Paul Papin, et al.
U.S. Appl. No. 15/825,855, filed Nov. 29, 2017, 2018/0149033 A1, Remi Roland Robert Mercier, et al.
U.S. Appl. No. 15/554,936, filed Aug. 31, 2017, 2018/0087389 A1, Philippe Gerard Edmond Joly, et al.

* cited by examiner

VANED RING FOR TURBOMACHINE STATOR HAVING VANES CONNECTED TO AN OUTER SHELL BY CONICAL SEATING AND FRANGIBLE PIN

TECHNICAL FIELD

The present invention relates to the field of turbomachines, notably intended for the propulsion of aircraft, and pertains to a vaned ring for turbomachine stator, in particular a ring of outlet guide vanes, intended to be arranged downstream of the fan within the secondary flow channel of a dual flow turbomachine.

PRIOR ART

A turbomachine comprises a certain number of stator vaned rings, also known as flow straighteners, the general function of which consists in straightening the air flow, that is to say attenuating the gyratory component which is induced in this air flow by the moveable vanes of the turbomachine.

Such a vaned ring is notably arranged within the secondary flow channel, downstream of the fan, and contributes to forming the intermediate casing of the turbomachine. The vanes of this ring are commonly designated outlet guide vanes (OGV).

The vanes are fixed by their respective roots to a hub of the intermediate casing and by their respective heads to an outer shell of this casing.

In certain turbomachines, outlet guide vanes fulfil a structural function, that is to say that they contribute to the transmission of forces between the hub and the outer shell of the intermediate casing.

Furthermore, it is common to arrange platforms between the heads of the vanes in order to channel externally the secondary flow. These platforms are in general fixed to the outer shell, and connected to the vanes in a leak tight manner.

The document FR3038344 of the Applicant illustrates an example of a vaned ring of this type. FIG. 3 of this document shows in particular orifices 23 intended for the passage of through fasteners provided to ensure the fixation of a vane head to the outer shell.

However, in this type of vaned ring, the vanes are likely to undergo significant mechanical stresses in radial compression, notably in the event of unbalance consecutive to damage of the rotor of the fan, for example due to the ingestion of a foreign body in the turbomachine. Such mechanical stresses may, in extreme cases, damage the vanes of the vaned ring.

DESCRIPTION OF THE INVENTION

The aim of the invention is notably to overcome at least partially this problem.

It proposes to this end a vaned ring for turbomachine stator, centred along an axis, and including:
 a hub,
 an outer shell extending around the hub,
 at least one vane extending along a radial direction with respect to the axis, and having a vane root arranged on a radially inner side, a vane head arranged on a radially outer side, and an airfoil connecting the vane root to the vane head, and
 two corresponding platforms arranged circumferentially on either side of the vane head, and fixed on a radially inner face of the outer shell by means of detachable fasteners, such that the platforms delimit a turbomachine flow channel.

According to the invention, the vane head has first conical seatings bearing on respective second conical seatings of the two platforms so as to prevent a displacement of the vane radially inwards and a displacement of the vane along the circumferential direction.

In addition, the vaned ring comprises one or more frangible pins cooperating with the vane, the frangible pin or each frangible pin including a pin base mounted on the outer shell and a pin head projecting radially inwards with respect to the outer shell and having a head surface forming, vis-à-vis a top surface of the vane head, a stop opposing a displacement of the vane radially outwards.

In normal operation, the conical seatings and the (or each) frangible pin ensure the maintaining in position of the vane head.

On the other hand, in the event of abnormal compressive radial force applied to the vane, for example due to a situation of unbalance of an associated rotor loading the vane root radially outwards, the top surface of the vane head loads the pin head of the (or each) frangible pin. Beyond a certain level, the stress undergone by the frangible pin causes the rupture of the latter, which makes it possible, due to the absence of direct fixation of the vane head to the outer shell, to release the stresses undergone by the vane, while absorbing a part of the energy brought into play.

The invention thereby makes it possible to reduce the risks of damaging the vane, and thus to extend the lifetime of the vaned ring, notably in the case of vanes made of composite material including a fibre reinforced polymer matrix.

In addition, the invention enables easy dismantling of the vaned ring, as regards the vane heads, by simply detaching the detachable fasteners connecting the platforms to the outer shell.

Preferably, the pin base is screwed into the outer shell so as to enable an adjustment of the radial position of the frangible pin.

Preferably, the frangible pin or each frangible pin comprises a frangible part arranged between the corresponding pin base and the pin head, and intended to break under the effect of a loading along the radial direction.

Preferably, the frangible pin or each frangible pin is made of a metal material and has its head surface at a radial distance from the outer shell comprised between 10 mm and 100 mm.

Preferably, the head surface has a rounded shape.

Preferably, the frangible pins cooperating with the vane are at least two in number, and are axially offset with respect to one another or with respect to each other.

Preferably, the vane head is dovetail shaped.

Preferably, the outer shell comprises an annular rib projecting radially inwards, forming a first axial stop against a first axial end of the vane head.

Preferably, the platforms comprise first respective circumferential ribs projecting radially outwards jointly forming a second axial stop against a second axial end of the vane head.

Preferably, layers of elastomeric material are interposed respectively between the first conical seatings and the second conical seatings.

Preferably, the top surface of the vane head comprises an antifriction coating.

The invention also relates to an intermediate casing for turbomachine, including a vaned ring of the type described above.

The invention also relates to a dual flow turbomachine for aircraft, including a vaned ring of the type described above or an intermediate casing of the type described above.

BRIEF DESCRIPTION OF THE DRAWINGS

The invention will be better understood and other details, advantages and characteristics thereof will become clearer on reading the following description given as a non-limiting example and by referring to the appended drawings in which.

In all of these figures, identical references may designate identical or analogous elements.

DETAILED DESCRIPTION OF PREFERRED EMBODIMENTS

Figure 1:
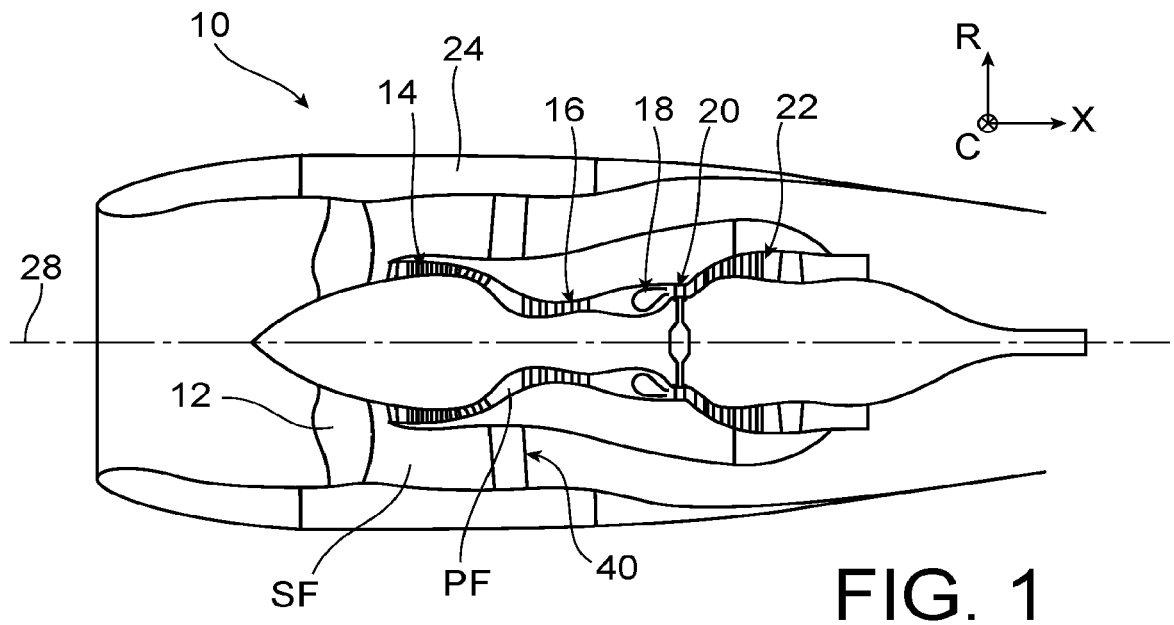
FIG. 1 is a schematic axial sectional view of a turbomachine according to a preferred embodiment of the invention.

FIG. 1 illustrates a dual flow twin sppol turbomachine 10 for aircraft, comprising generally speaking a fan 12 intended to suck in a flow of air dividing downstream of the fan into a primary flow circulating in a primary flow channel, hereafter designated primary flow path PF, within a core of the turbomachine, and a secondary flow bypassing this core in a secondary flow channel, hereafter designated secondary flow path SF.

The core of the turbomachine comprises, generally speaking, a low pressure compressor 14, a high pressure compressor 16, a combustion chamber 18, a high pressure turbine 20 and a low pressure turbine 22.

The turbomachine is streamlined by a nacelle 24 surrounding the secondary flow path SF. Furthermore, the rotors of the turbomachine are rotationally mounted around an axis 28 of the turbomachine.

Throughout this description, the axial direction X is the direction of the axis 28, whereas the radial direction R is at all points a direction orthogonal to the axis 28 and passing through the latter, and the circumferential or tangential direction C is at all points a direction orthogonal to the radial direction R and to the axis 28. The terms "inner" and "outer" refer respectively to a relative proximity, and a relative distance, of an element with respect to the axis 28. Furthermore, the "upstream" and "downstream" directions are defined with reference to the general flow of gases in the turbomachine.

Figure 2:
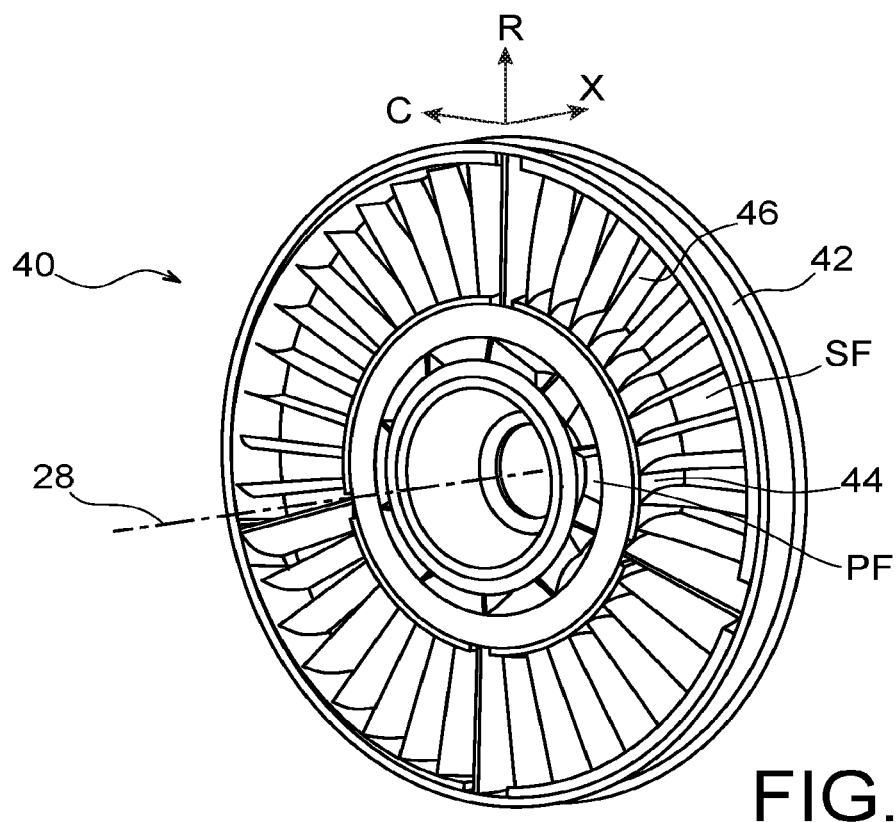
FIG. 2 is a schematic perspective view of an intermediate casing of the turbomachine of FIG. 1, represented isolated, including in particular a vaned ring including outlet guide vanes.

The turbomachine includes an intermediate casing 40 arranged downstream of the fan 12, axially between the low pressure compressor 14 and the high pressure compressor 16, and represented isolated in FIG. 2.

This intermediate casing 40 comprises a vaned ring, centred on the axis 28, and including an outer shell 42, a hub 44, and vanes 46, commonly called outlet guide vanes (OGV) or flow straightening vanes, which extend through the secondary flow path SF by connecting the outer shell 42 to the hub 44. The outer shell 42 extends around the secondary flow path SF and the hub 44, whereas the hub 44 extends radially inwards with respect to the secondary flow path SF, and radially outwards with respect to the primary flow path PF. The vanes 46 are made of a composite material including a fibre reinforced polymer matrix, or are made of metal.

The present invention is particularly advantageous when some or all of the vanes 46 fulfil a structural function, that is to say transmit forces between the hub 44 and the outer shell 42, as will be seen more clearly hereafter. The invention may however be applied to vanes not fulfilling such a structural function.

Figure 3:
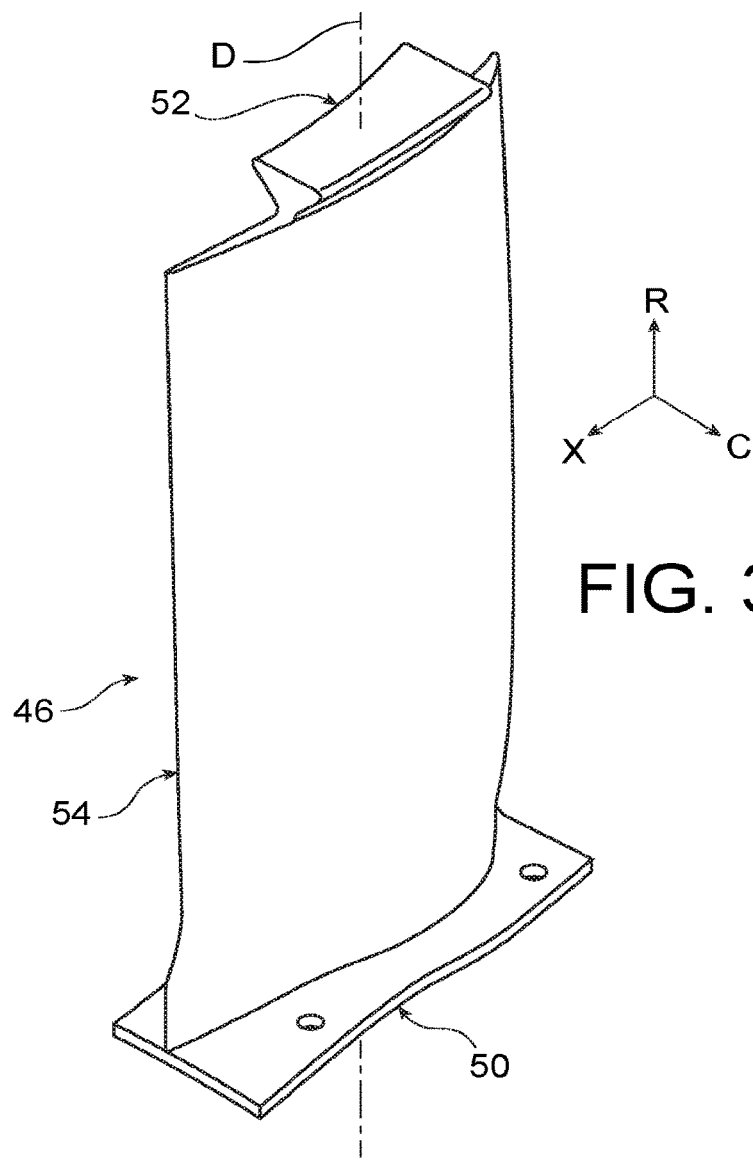
FIG. 3 is a schematic perspective view of an outlet guide vane belonging to the vaned ring of the intermediate casing of FIG. 2.

As shown in FIG. 3, a vane 46 generally comprises a vane root 50, a vane head 52 arranged radially opposite to the vane root, and an airfoil 54 extending along a spanwise direction D of the vane, while connecting the vane root 50 to the vane head 52 (the spanwise direction D generally being a radial direction defined in a median plane of the vane). The vane root 50 is intended to be fixed to the hub 44, which can be accomplished by a known technique and will not be described in detail herein. The vane head 52 is intended to be connected to the outer shell 42, in a manner that will be described in detail hereafter.

Figure 4:
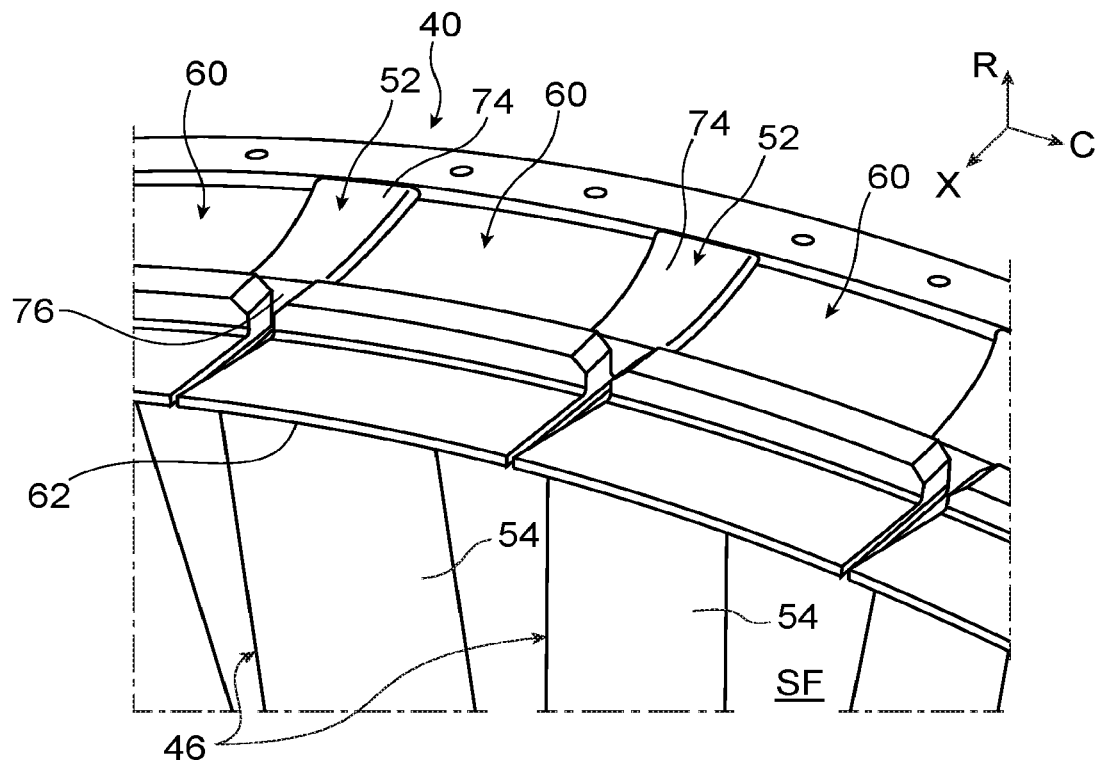
FIG. 4 is a partial schematic perspective view of the vaned ring, of which a radially outer portion delimited by the plane A-A of FIG. 8 has been removed.
Figure 5:
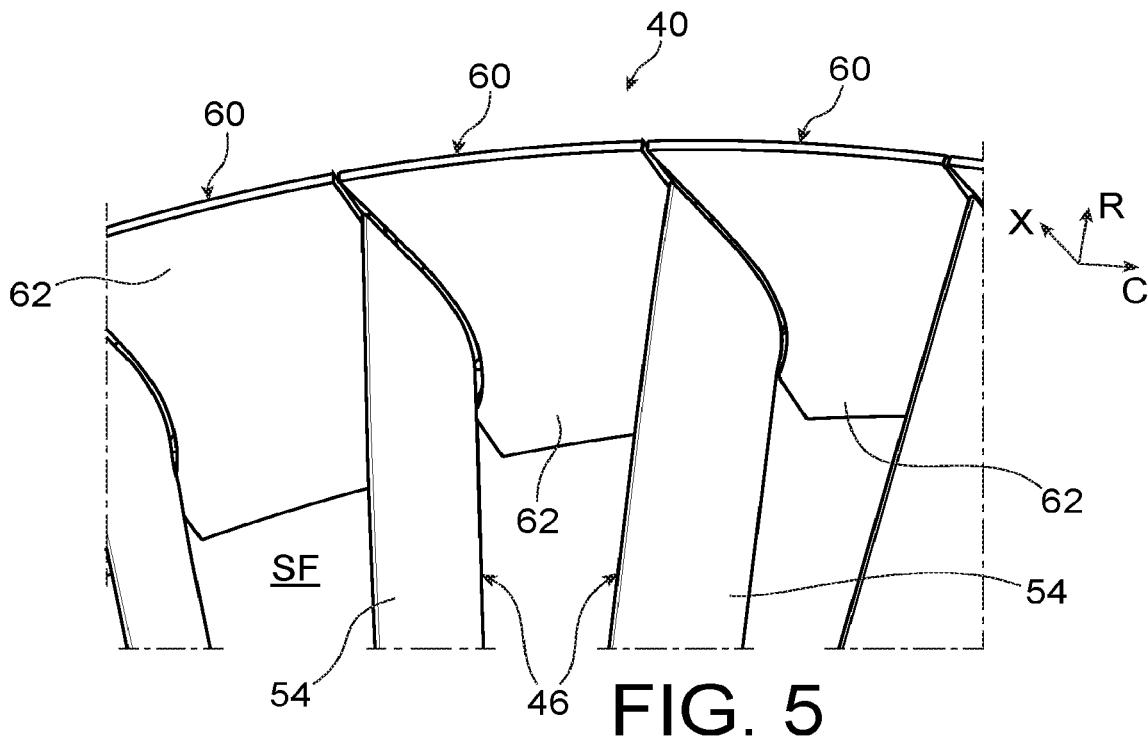
FIG. 5 is a partial schematic perspective view of the vaned ring, under another viewing angle.

The vaned ring further comprises platforms 60 (FIGS. 4 and 5) fixed on a radially inner face 61 (FIGS. 7 and 8) of the outer shell 42 and arranged respectively between the respective vane heads 52 of the vanes 46 (FIGS. 4 and 5), such that the platforms 60 each have a radially inner face 62 externally delimiting the secondary flow path SF.

The invention generally speaking proposes that the connection between at least one of the vane heads 52 and the outer shell 42 is a fixed link type connection (i.e. with zero degrees of freedom) achieved by means of bearing surfaces/points, one of these having a fuse function in the event of abnormal compressive force. In particular, the vane head 52 is not fixed directly to the outer shell 42 by means of through fasteners (of rivet or bolt type) as in the prior art, but is bearing on seatings formed by the adjacent platforms 60, and is blocked radially outwards by at least one frangible pin mounted on the outer shell 42, as will become clearer hereafter.

To this end, the vane head 52 has first conical seatings 70 (FIGS. 3A and 7) bearing on respective second conical seatings 72 (FIGS. 6 and 7) of the two platforms 60 adjacent to the vane head 52 and situated circumferentially on either side of the latter. The first and second conical seatings 70, 72 are inclined with respect to the spanwise direction D of the vane. The second conical seatings 72 thereby prevent a displacement of the vane 50 radially inwards and a displacement of the vane along the circumferential direction C.

In addition, the vaned ring comprises at least one frangible pin 73 (FIG. 7), including a pin base 73A mounted on the outer shell 42 and a pin head 73B projecting radially inwards with respect to the outer shell 42, which pin head 73B has at its free end a head surface 73C forming a stop opposing a radially outward displacement of a top surface 74 at the free end of the vane head 52.

Figure 3A:
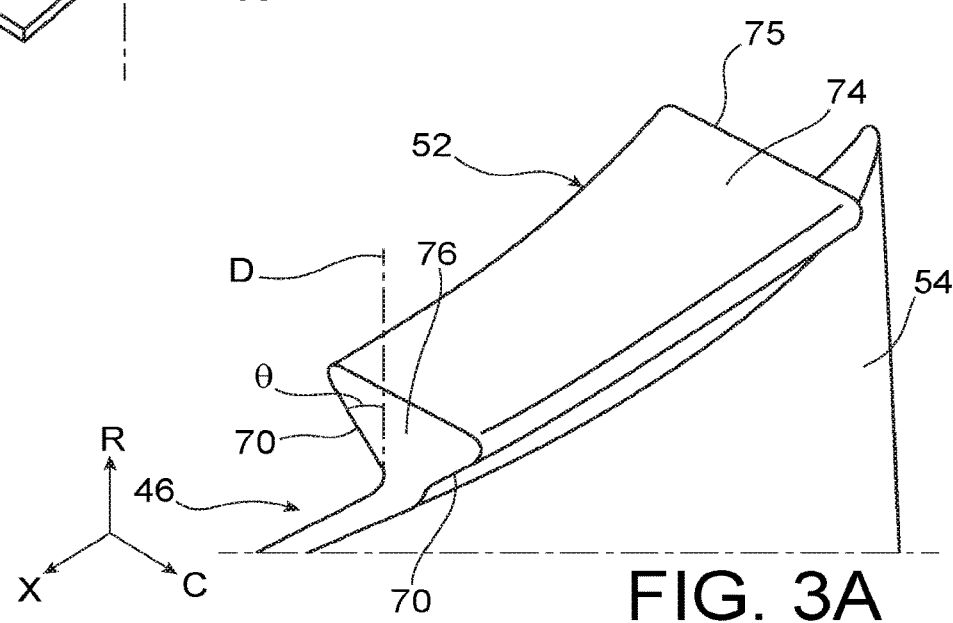
FIG. 3A is a larger scale view of a part of FIG. 3.

With reference to FIG. 3A, the first conical seatings 70 are respectively arranged on the two circumferential sides of the vane head 52 and are each inclined by an angle θ, for example comprised between 20 and 60 degrees, with respect to the spanwise direction D, in a sectional view transversal to the axis 28. The second conical seatings 72 (FIGS. 6 and 7) have a shape substantially complementary to the shape of the first conical seatings 70.

The vane head 52 further has, at its upstream and downstream axial ends, an upstream surface 75 and a downstream surface 76 that are substantially flat, these two surfaces extending substantially orthogonally to the axial direction X.

The vane head 52 finally has at its radially outer end the aforesaid top surface 74.

In the preferred embodiment of the invention, the vane head 52 is dovetail shaped.

Figure 6:
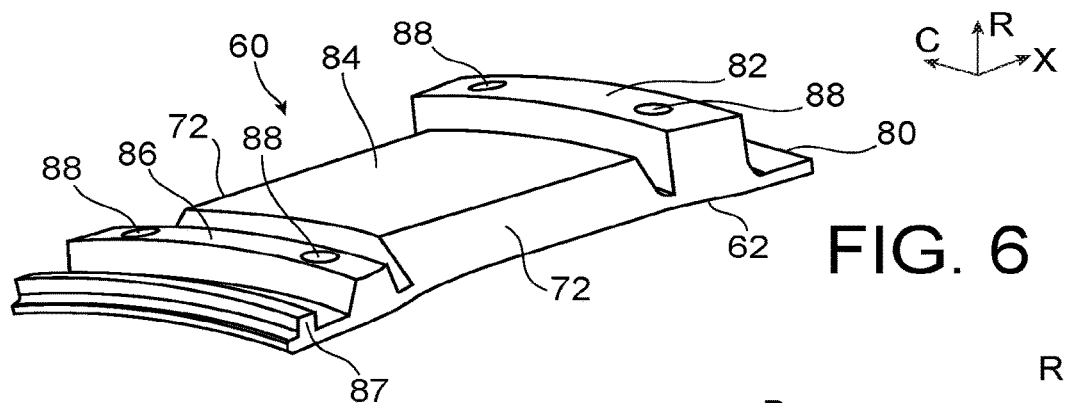
FIG. 6 is a schematic perspective view of a platform belonging to the vaned ring.

FIG. 6 illustrates one of the platforms 60 represented isolated. This platform comprises a base 80, forming the radially inner face 62 which externally delimits the secondary flow path SF, and from which extends, projecting radially outwards, a first circumferential rib 82, a median block 84, a second circumferential rib 86, and a third circumferential rib 87.

The first circumferential rib 82 and the second circumferential rib 86 each comprise orifices 88 intended for the passage of detachable fasteners ensuring the fixation of the platform 60 to the outer shell 42. The number of orifices 88 is for example two orifices for each of the first and second circumferential ribs 82, 86. Each of the orifices 88 preferably includes a housing such as a countersink, a counterbore or analogous, emerging into the radially inner face 62, in order to house a head of the corresponding detachable fastener.

The third circumferential rib 87 contributes to stiffening the platform 60.

The median block 84 has circumferential ends forming respectively the second conical seatings 72.

Figure 7:
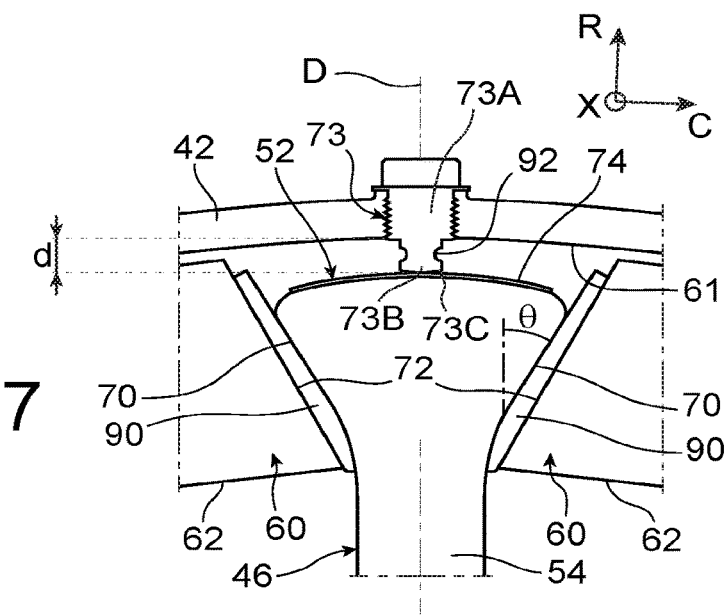
FIG. 7 is a partial schematic transversal sectional view of the vaned ring.
Figure 8:
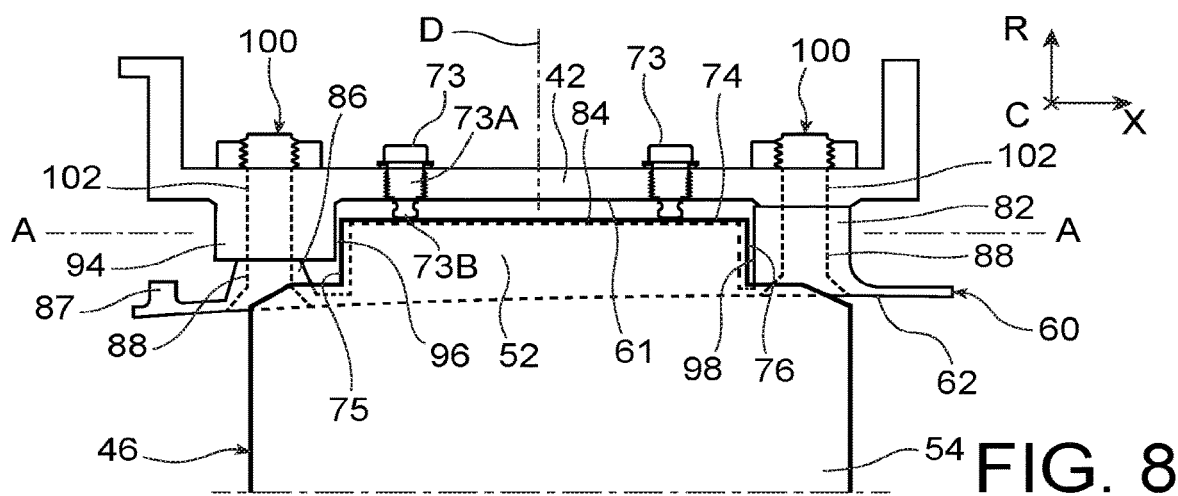
FIG. 8 is a partial schematic axial sectional view of the vaned ring.

FIGS. 7 and 8 illustrate the way the vane head 52 is connected to the outer shell 42.

As shown in FIG. 7, the vane head 52 is interposed circumferentially between the two adjacent platforms 60 such that the first conical seatings 70 of the vane head 52 are bearing on the corresponding second conical seatings 72 of the two adjacent platforms 60.

In the preferred embodiment of the invention, layers of elastomeric material 90 are interposed respectively between the first conical seatings 70 and the second conical seatings 72. These layers of elastomeric material 90 make it possible to absorb potential manufacturing defects and to further ensure the leak tightness of the secondary flow path SF along the vane 46.

FIGS. 7 and 8 further make it possible to perceive the frangible pins 73, for example two in number, which cooperate with the vane head 52 of the vane 46.

The pin base 73A of each of the frangible pins 73 is for example screwed into the outer shell 42. The radial position of the frangible pins 73 is thereby adjustable.

The head surface 73C of the pin head 73B of each of the frangible pins 73 has a rounded shape.

The top surface 74 of the vane head 52 preferably comprises an antifriction coating on which bear the respective head surfaces 73C of the respective pin heads 73B of the frangible pins 73.

In addition, with reference to FIG. 7, the top surface 74 of the vane head 52 also preferably has a rounded shape.

Each of the frangible pins 73 is preferably centred circumferentially with respect to the top surface 74.

Thus, the contact between each of the frangible pins 73 and the top surface 74 is quasi-punctiform and is located on a ridge line of the top surface 74.

Each of the frangible pins 73 is preferably made of a metal material. In addition, the head surface 73C of each of the frangible pins 73 advantageously extends to a radial distance d from the outer shell 42, comprised between 10 mm and 100 mm.

In normal operation, the pin head 73B of each of the frangible pins 73 makes it possible to radially maintain the vane head 52 bearing against the second conical seatings 72 of the platforms 60.

In addition, the frangible pins 73 preferably each include a frangible part 92 (FIG. 7) intended to break under the effect of a compressive loading along the radial direction R of a level exceeding a predefined threshold. The frangible part is typically a segment of reduced section, defined by an annular rib of the frangible pin 73.

Thus, in the event of radial compressive force of a level exceeding a predefined threshold, for example due to a situation of unbalance of an associated rotor loading the vane root 50 radially outwards, the top surface 74 of the vane head 52 loads the pin head 73B of each of the frangible pins 73. Beyond the predefined threshold, the stress undergone by each frangible pin causes the rupture of the corresponding frangible part 92. A release of the stresses undergone by the vane 46 ensues, as well as the absorption of a part at least of the energy brought into play.

The frangible pins 73 thereby fulfil a fuse function in the event of abnormally high compressive force, and thereby make it possible to dissipate a part of the corresponding energy.

Furthermore, as shown in FIG. 8, the outer shell 42 comprises an annular rib 94 projecting radially inwards. This annular rib 94 forms a first axial stop 96 against the upstream surface 75 of the vane head 52, the latter forming a first axial end of the vane head 52.

In addition, the respective first circumferential ribs 82 of the platforms 60 jointly form a second axial stop 98 against the downstream surface 76 of the vane head 52, the latter forming a second axial end of the vane head 52.

In the preferred embodiment of the invention, layers of elastomeric material (not visible in the figures) are interposed respectively between the axial ends of the vane head 52 and the first and second axial stops 96 and 98. These layers of elastomeric material make it possible to absorb potential play between the axial ends of the vane head 52 and the first and second axial stops 96, 98.

FIG. 8 further makes it possible to perceive the detachable fasteners 100 mounted through the orifices 88 of the platforms 60 and corresponding orifices 102 of the outer shell 42, so as to ensure the fixation of the platforms 60 to the outer shell 42.

Obviously, the mode of connecting to the outer shell 42 described above is preferably applied to all of the vanes 46 of the vaned ring.

Generally speaking, the invention has the advantage of reducing the risks of damaging the vane 46, and thus of increasing the lifetime of the vaned ring.

The removal of the vanes 46 may further be carried out easily as regards the vane heads 52, by simply detaching the detachable fasteners 100 connecting the platforms 60 to the outer shell 42.

The invention claimed is:

1. A vaned ring for turbomachine stator, centered along an axis, the vaned ring comprising:
   a hub;

an outer shell extending around the hub;

a vane extending along a radial direction with respect to the axis, the vane including a vane root arranged on a radially inner side, a vane head arranged on a radially outer side, and an airfoil connecting the vane root to the vane head; and two corresponding platforms arranged circumferentially on either side of the vane head, and fixed on a radially inner face of the outer shell by detachable fasteners, such that the two platforms delimit a turbomachine flow channel, wherein the vane head has first conical seatings bearing on respective second conical seatings of the two platforms such that the vane head is not fixed directly to the outer shell by fasteners so as to prevent a displacement of the vane radially inwards and a displacement of the vane along the circumferential direction, and wherein the vaned ring further comprises a frangible pin cooperating with the vane, the frangible pin including a pin base mounted on the outer shell and a pin head projecting radially inwards with respect to the outer shell and having a head surface forming a stop opposing a radially outward displacement of a top surface of the vane, the frangible pin abutting the top surface of the vane and not passing through the vane.

2. The vaned ring according to claim 1, wherein the pin base is screwed into the outer shell so as to enable an adjustment of a radial position of the frangible pin.

3. The vaned ring according to claim 1, wherein the frangible pin comprises a frangible part arranged between the pin base and pin head, and configured to break under loading along the radial direction.

4. The vaned ring according to claim 1, wherein the frangible pin is made of a metal material and the head surface at a radial distance from the outer shell comprised between 10 mm and 100 mm.

5. The vaned ring according to claim 1, wherein the head surface has a rounded shape.

6. The vaned ring according to claim 1, comprising another frangible pin which is axially offset with respect to the frangible pin.

7. The vaned ring according to claim 1, wherein the vane head is dovetail shaped.

8. The vaned ring according to claim 1, wherein the outer shell comprises an annular rib projecting radially inwards, forming a first axial stop against a first axial end of the vane head.

9. The vaned ring according to claim 1, wherein the platforms comprise respective first circumferential ribs projecting radially outwards jointly forming a second axial stop against a second axial end of the vane head.

10. The vaned ring according to claim 1, wherein layers of elastomeric material are interposed respectively between the first conical seatings and the second conical seatings.

11. The vaned ring according to claim 1, wherein the top surface of the vane head comprises an antifriction coating.

12. The vaned ring according to claim 1, wherein a length of the vane head in an axial direction is less than a length of the airfoil in the axial direction.

13. An intermediate casing for a turbomachine, including a vaned ring according to claim 1.

14. A dual flow turbomachine for an aircraft, including an intermediate casing according to claim 13.

* * * * *